Oct. 13, 1970  J. E. PURNEY, SR  3,534,357
CUSTOMER IDENTIFYING SIGNAL SYSTEM
Filed Sept. 22, 1966  3 Sheets-Sheet 1
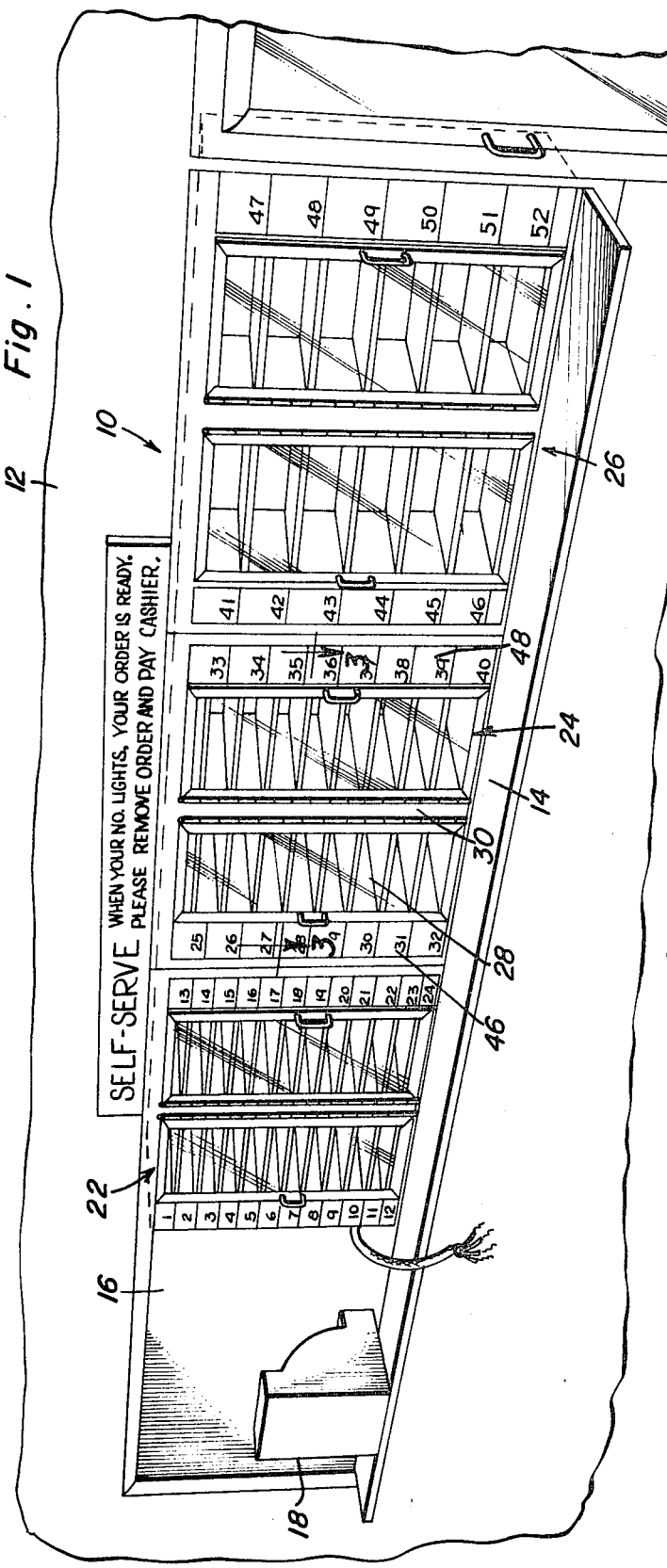
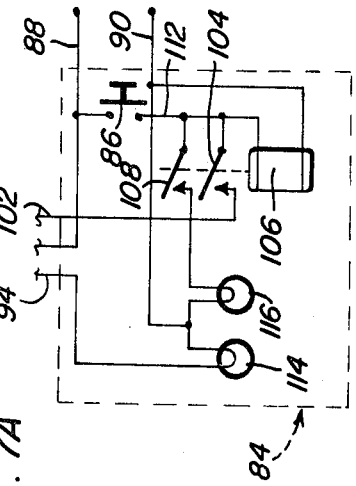
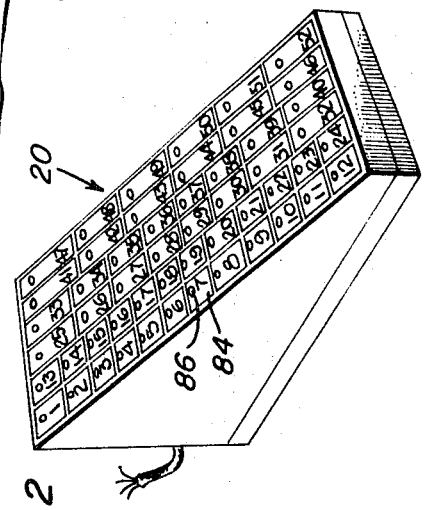
John E. Purney, Sr.
INVENTOR.
BY *Clarence A. O'Brien*
and *Harvey B. Jackson*
Attorneys Oct. 13, 1970  J. E. PURNEY, SR  3,534,357
CUSTOMER IDENTIFYING SIGNAL SYSTEM
Filed Sept. 22, 1966  3 Sheets-Sheet 2
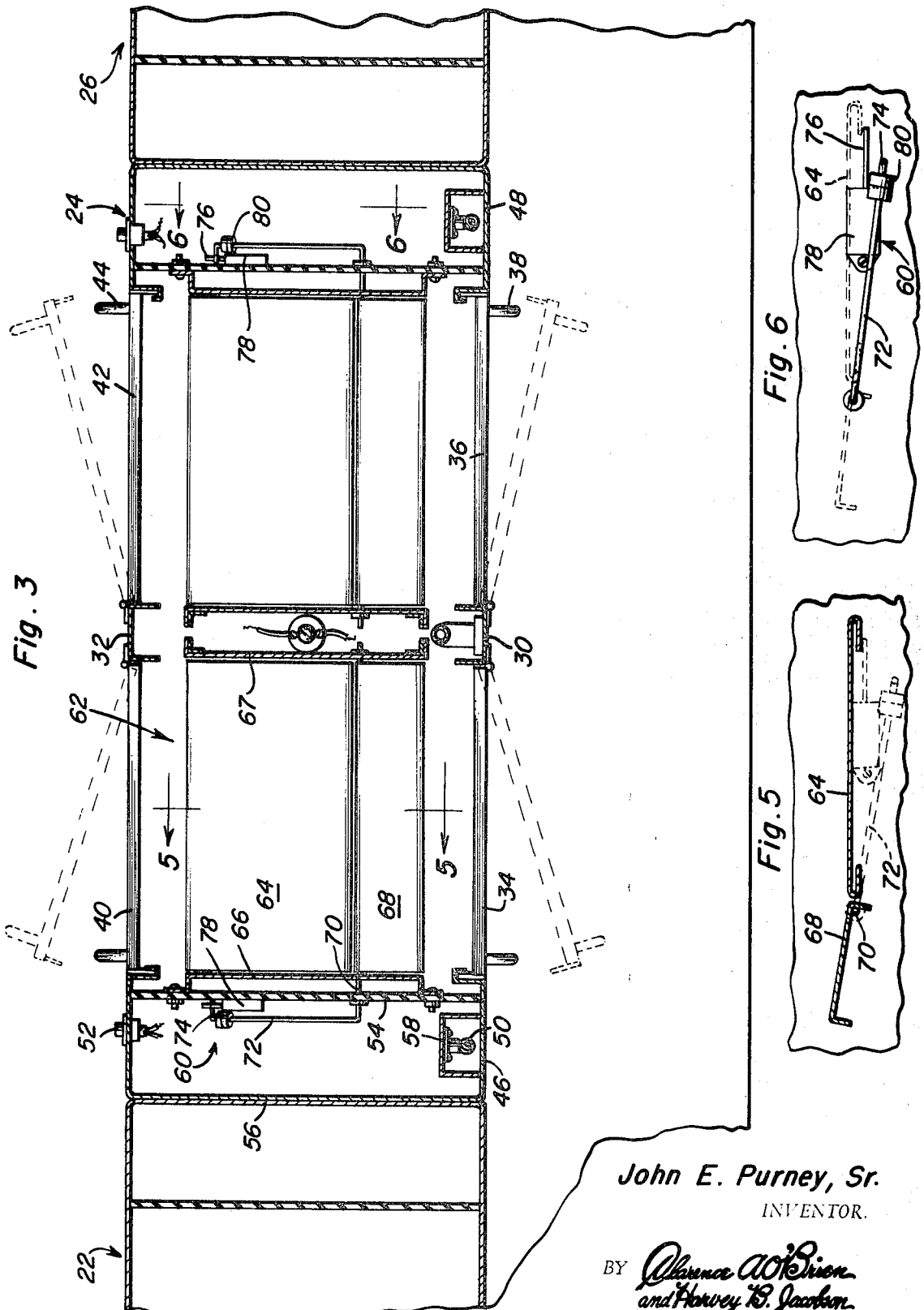
John E. Purney, Sr.
INVENTOR.

Oct. 13, 1970     J. E. PURNEY, SR     3,534,357
CUSTOMER IDENTIFYING SIGNAL SYSTEM
Filed Sept. 22, 1966     3 Sheets-Sheet 3
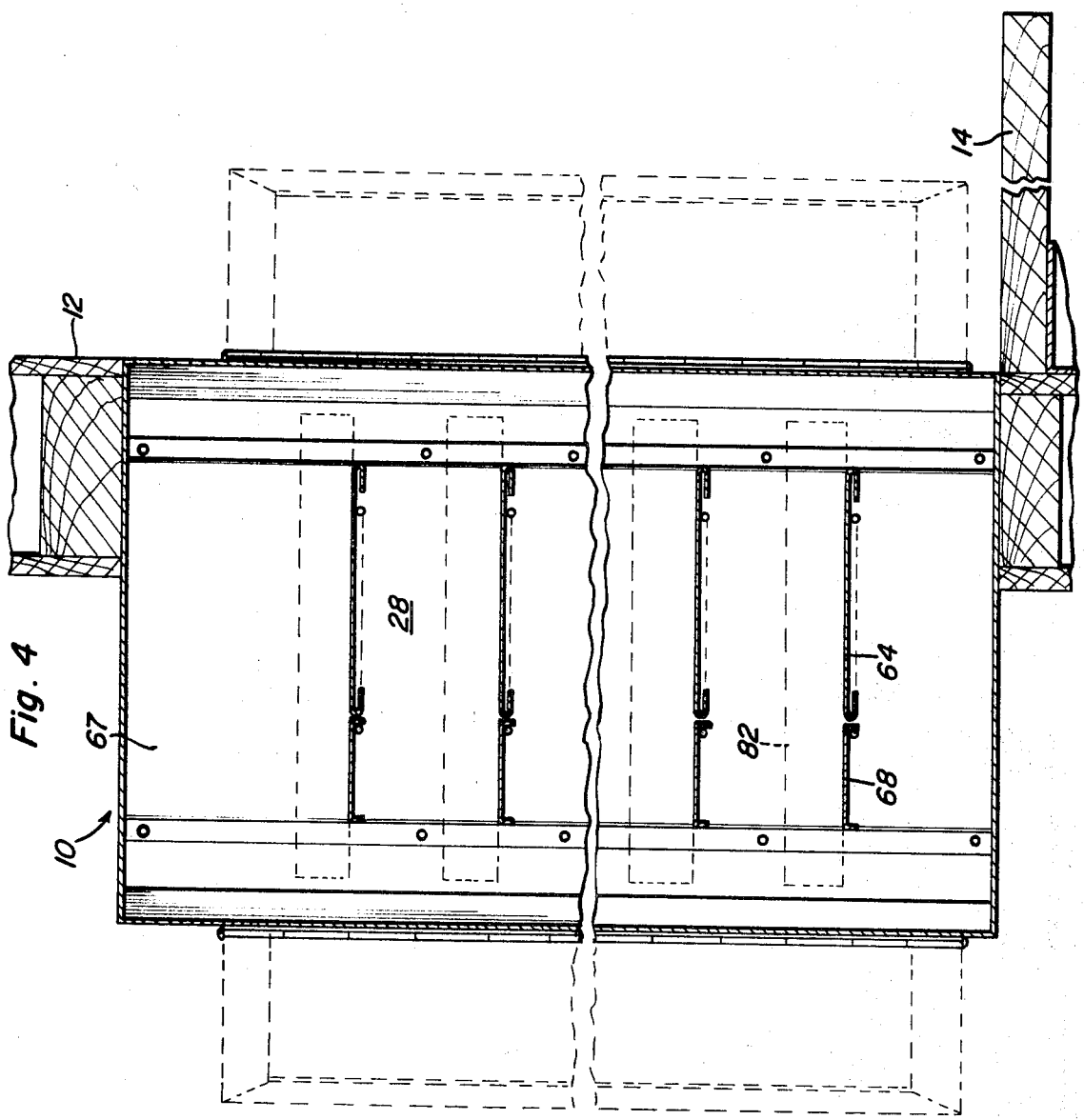
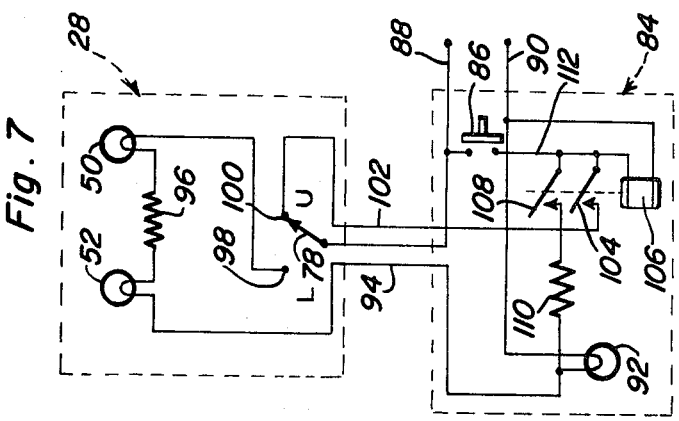
John E. Purney, Sr.
INVENTOR.

United States Patent Office 3,534,357
Patented Oct. 13, 1970

3,534,357
CUSTOMER IDENTIFYING SIGNAL SYSTEM
John E. Purney, Sr., 3739 Bellwood Drive,
Canton, Ohio 44708
Filed Sept. 22, 1966, Ser. No. 581,391
Int. Cl. G08b 5/36, 13/14
U.S. Cl. 340—280      9 Claims

ABSTRACT OF THE DISCLOSURE

A food serving compartment is assigned to a customer by actuation of a selector switch on a remote control panel energizing a compartment identifying lamp on the panel through a relay. When the compartment is loaded, an energizing circuit for the panel lamp and load indicator lamps at the compartment is completed and the relay de-energized so that upon removal of the food item, all lamps are extinguished.

---

This invention relates to the merchandising of food items such as pizza pies that are made or baked to order on the premises and more particularly to the orderly dispensing of such items on a relatively large scale.

Where items of the aforementioned type are made to order on a large scale, it becomes essential that such orders be handled in an efficient manner so as to service all of the customers rapidly. The apparatus of the present invention therefore has as its major objective to provide for the efficient and rapid handling of orders and dispensing of items so ordered by customers.

In accordance with the foregoing objects, the apparatus of the present invention includes a wall mounted cabinet structure within which a plurality of compartments are formed with at least two doors associated with each compartment through which items may be inserted and removed by service personnel and customers respectively. Each compartment is accordingly labeled by a number for example and provided with indicators visible to both the customer and service personnel signifying the assignment of a compartment to a customer. The compartment is assigned to a customer by the person taking the order using a control panel having illuminated compartment labels and associated selector switches adapted to be actuated when making an assignment. Thus, a control system is associated with the apparatus through which each order is assigned a particular compartment and whereby each customer is notified when their order is ready within the assigned compartment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical installation for the apparatus of the present invention.

FIG. 2 is a perspective view of the control panel assembly associated with the apparatus of the present invention.

FIG. 3 is a partial sectional view taken substantially through a plane indicated by section line 3—3 in FIG. 1.

FIG. 4 is a transverse sectional view through the apparatus showing compartments therein in a loaded condition.

FIG. 5 is a partial transverse sectional view taken substantially through a plane indicated by section line 5—5 in FIG. 3 showing a shelf in the compartment in an unloaded condition.

FIG. 6 is a partial sectional view taken substantially through a plane indicated by section line 6—6 in FIG. 3.

FIG. 7 is an electrical circuit diagram associated with the control system of the present invention.

FIG. 7A is a partial electrical circuit diagram illustrating a modification of the circuit shown in FIG. 7.

Referring now to the drawings in detail, FIG. 1 illustrates a typical installation for the apparatus of the present invention wherein a horizontally elongated cabinet assembly generally referred to by reference numeral 10 is mounted within an opening formed in the wall 12 above a counter shelf 14 for example. The cabinet assembly may be installed adjacent to a service opening in the wall 16 where a cashier may be located adjacent to the cash register 18. Also suitably located behind the service wall 12 and electrically wired to facilities mounted within the cabinet assembly 10, is a control panel assembly 20 as shown in FIG. 2.

With continued reference to FIG. 1 and to FIGS. 3 and 4, it will be noted that the cabinet assembly may include a plurality of sections such as the sections 22, 24 and 26, each section enclosing compartments 28 of the same size in two vertical rows on opposite sides of posts 30 and 32 that form part of the compartment section frame on opposite sides of the cabinet respectively facing the customers and service personnel. Each section of the cabinet assembly is similar in construction and arrangement except that the compartments in the respective sections are of different sizes so as to accommodate items of different sizes. Accordingly, the smaller size items are inserted within the compartments of the cabinet section 22, intermediate size items being inserted into the compartments of the section 24 while the largest size items are placed in the compartments of cabinet section 26. Different numbers of compartments are therefore associated with the respective cabinet sections where the sections are all of equal over-all size. Compartments 28 within each cabinet section are closed by a pair of transparent access doors 34 and 36 hinged to the central frame post 30 and provided with handles 38 so that customers may remove orders. The orders are placed within the compartments by service personnel on the opposite side of the cabinet assembly by opening the access doors 40 and 42 through handles 44. The compartments within each cabinet section are framed by side indicator panels 46 and 48 through which each compartment 28 is labeled by a number for example. Each label is illuminated by an indicator lamp 50 in order to signify to the customer that the order has been completed and placed in the assigned compartment. An indicator lamp 52 corresponding to each of the compartment indicator lamps 50 is also mounted on the opposite side of the cabinet assembly within view of the service personnel.

As more clearly seen in FIG. 3, each compartment 28 is provided with a non-conductive side wall 54 spaced from an end wall 56 of the section forming an end space within which the bracket 58 for the indicator lamp 50 is enclosed and within which a plurality of load responsive switch devices 60 are enclosed associated with each of the compartments. The compartments are spaced from each other by means of load supporting shelf assemblies generally referred to by reference numeral 62 to which the load responsive switch devices 60 are connected. As shown in FIGS. 3, 5 and 6 each shelf assembly includes a fixed portion 64 supported between the bracket 66 secured to the side wall 54 and one of the spaced partition walls 67 disposed in alignment between the frame posts 30 and 32. Also associated with each shelf assembly 62, is a pivotally displaceable shelf portion 68 connected to a pivot shaft 70 which is rotatably mounted between the partition wall 67 and bracket 66 and extends through the end wall 54. Connected to the pivot shaft 70 at right angles thereto is an actuating arm 72 associated with the load responsive switch device 60. Each switch actuating arm 72 extends rearwardly from the pivot shaft 70 and is provided with a right angle end portion 74 which underlies a switch actuating element 76 projecting from an electrical switch mechanism 78 fixed to the side wall 54. Mounted in an adjustable position on each of the switch actuating arms 72 is a weight element 80 for downwardly biasing the switch arm 72 so as to normally hold the displaceable portion 68 of the shelf assembly at a slight upward angle to the fixed shelf portion 64 as more clearly shown in FIG. 5. It will be apparent therefore, that when an item such as a boxed pizza pie 82 is placed on the shelf assembly as shown in FIG. 4, the movable portion 68 of the shelf assembly is displaced to a horizontal position aligned in the plane of the fixed shelf portion against the bias of the weight element 80. The switch arm 72 is thereby upwardly displaced to sense the presence of the item within a compartment by actuating the switch element 76 from an unload position to a load position within the switch mechanism 78.

The indicator lamps 50 and 52 and the load responsive switch devices 60 associated with each of the compartments are electrically wired to the control panel assembly shown in FIG. 2. The control panel assembly includes a plurality of compartment identifying portions 84 bearing labels corresponding to the labels associated with the compartments 28 in the cabinet assembly. Each compartment identifying portion 84 is therefore adapted to be illuminated and is provided with a pushbutton selector switch 86 through which the compartment is assigned to a customer. A customer may therefore place an order with the person operating the control panel assembly 20. This person will then actuate one of the selector switches 86 associated with an unassigned compartment. Those compartment identifying portions 84 on the control panel that are not illuminated will be unassigned. Also, the selection is made within a column of compartments corresponding to orders of a particular size or type. Personnel preparing the orders may therefore glance at the illuminated portions 86 of the control panel assembly 20 in order to receive instructions for preparing an order. When an order is completed, it is placed in an assigned compartment corresponding to an illuminated portion 84 on the control panel at which point the indicator lamps 50 and 52 associated with this compartment will be illuminated. The customer may then remove the order from the compartment at which point both of the indicator lamps 50 and 52 associated with the compartment will be extinguished as well as the corresponding portion 84 on the control panel assembly 20. The control panel operator will then know that this compartment may be reassigned to another customer placing a similar order.

From the foregoing description, it will be appreciated that the apparatus is operative through its control system to automatically register the assignment of compartments to customers and cancel such assignment once an order is completed and has been removed from the assigned compartment by the customer. The system therefore operates as an automatic memory for the personnel in a relatively large scale operation of the type to which the present invention pertains. Accordingly, each compartment 28 is electrically wired to a corresponding portion 84 on the control panel assembly as diagrammatically shown in FIG. 7. A source of voltage is connected to each control portion 84 through a pair of electrical power lines 88 and 90. The compartment identifying portion 84 is adapted to be illuminated by a lamp 92 connected to the power line 90 and to indicator lamp 52 at the corresponding compartment 28 through conductor 94. The indicator lamp 52 is connected by the resistor 96 to the other indicator lamp 50 which in turn is connected to the contact 98 engaged by the load responsive switch mechanism 78 in its load position. When the switch device 78 is in its unload position engaging the contact 100, as shown in FIG. 7, it connects the power line 88 to the conductor 102. The conductor 102 is connected to a normally opened relay holding switch 104 associated with the relay coil 106. Also associated with the relay coil 106, is a normally opened switch 108, the open contact of which is connected through the load resistor 110 to conductor 94. The relay coil 106 is energized so as to close the relay switches 104 and 108 upon momentary closing of the selector switch 86. Toward this end the selector switch 86 upon being closed connects the power line 88 to one terminal of the relay coil 106 and to both relay switches through conductor 112, the other terminal of the relay coil 106 being connected to the power line 90.

When a customer is assigned a compartment 28 as hereinbefore described, monetary closing of the selector switch 86 completes an energizing circuit through the relay coil 106 closing both of the relay switches 104 and 108. If the compartment so assigned is empty, the load responsive switch device 78 will be engaged with the contact 100 as shown in FIG. 7 so as to complete a relay holding circuit through the holding relay switch 104 in order to maintain the relay coil 106 energized after the selector switch 86 is released. Energization of the relay coil also closes the normally open relay switch 108 so as to complete a parallel energizing circuit for the lamp 92 from the power line 88, through the load responsive switch 78 in its unload position, conductor 102, closed relay holding switch 104, relay switch 108 and resistor 110. The lamp 92 is thereby illuminated to signify that the compartment corresponding to the selected portion 84 of the control assembly has been assigned. When the order has been filled and placed within the corresponding compartment 28, the load responsive switch mechanism 78 is displaced to its load position engaging the contact 98. The relay holding circuit is thereby interrupted so as to cause the deenergization of the relay coil 106 for reset purposes. A series lamp circuit is then completed from power line 88 through the load responsive switch 78 engaging contact 100, lamp 50, resistor 96, lamp 52, conductor 94, lamp 92 back to power line 90 by-passing the relay. The indicator lamps 50 and 52 as well as the compartment identifying lamp 92 at the control panel assembly will then be connected in series with the resistor 96 across the power lines so that all of these lamps will be illuminated simultaneously even though the relay is denergized. When the order is removed from the compartment, the load responsive switch device 78 returns to its unload position in which case all of the lamps will be extinguished since the relay is then deenergized.

FIG. 7A illustrates a modification of the electrical control system shown in FIG. 7 by means of which the condition of the relay may be indicated at the control panel assembly in order to signify whether or not the order has been placed in an assigned compartment. Toward this end, the load resistor 110 as described in connection with FIG. 7 is omitted and two lamps 114 and 116 provided at the control portion 84. The lamp 116 is connected between the normally opened relay switch 108 and the power line 90 so that when the relay 106 is energized, only lamp 116 will be illuminated to signify the assignment of a particular compartment before any order is placed therein. When an order is placed in this assigned compartment, the relay coil 106 is deenedgized as hereinbefore described in connection with FIG. 7. The relay switch 108 is then opened to deenergize the lamp 116. Lamp 114 is however energized since it is then connected in series with the indicator lamps 50 and 52 as hereinbefore described in connection with FIG. 7. Accordingly, the portion 84 of the control panel assembly remains illuminated with a different light to continue indicating the assignment of the compartment as well as to signify placement of the order therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A service apparatus for dispensing ordered items comprising a cabinet having a plurality of compartments, each compartment having a pair of access doors through which said items are respectively inserted and removed from the compartment, a load responsive switch device movable from an unload position to a load position and load indicators mounted adjacent each of the access doors, a control panel having a plurality of selector switches respectively corresponding to said compartments and panel indicators mounted adjacent to said selector switches, a source of voltage connected to each of said switch devices and the selector switch corresponding thereto, relay means energized in response to closing of the selector switch when the switch device is in the unload position, means connecting only the panel indicator to the source of voltage in response to said energization of the relay means, and series circuit means connecting the load indicators to the source of voltage in series with the panel indicator in response to movement of the switch device to the load position de-energizing the relay means, whereby the load and panel indicators are de-energized when the switch device is subsequently returned to the unload position upon removal of the item from the compartment.

2. In a signalling system responsive to placement or removal of an article from a compartment, a switch device for sensing the presence of a load within the compartment, said switch device having a movable element displaceable between two operative positions engaging a pair of switch contacts and an indicator connected to one of the contacts engaged by the switch device when sensing the load, a remote control circuit comprising a source of voltage having a pair of power terminals, one of said terminals being connected to the movable element of the switch device, a normally open selector switch connected to said one of the power terminals, a relay coil having opposite sides connected to said power terminals by the selector switch upon closing thereof, a holding circuit including a first normally open relay switch connected between one of the sides of the relay coil and the other of said pair of switch contacts, a selection identifying device connected between the indicator and the other of said power terminals and a second normally open relay switch connected between said one of the sides of the relay coil and the indicator in parallel with the selection identifying device, said relay switches being closed by energization of the relay coil to respectively complete an energizing circuit for the selection identifying device and complete the holding circuit through said other of the switch contacts, an energizing circuit for the indicator and selection identifying device in series with each other being completed through said one of the switch contacts opening the holding circuit upon displacement of the movable element of the switch device to the position engaging said one of the switch contacts.

3. The combination of claim 2 wherein said indicator includes a pair of lamps interconnected in series by a resistor.

4. The combination of claim 3 wherein said selection identifying device includes a lamp connected to the other of said power terminals and resistance means interconnected between the indicator and the second relay switch.

5. The combination of claim 4 wherein said resistance means comprises a second lamp.

6. The combination of claim 2 wherein said selection identifying device includes a lamp connected to the other of said power terminals and resistance means interconnected between the indicator and the second relay switch.

7. The combination of claim 6 wherein said resistance means comprises a second lamp.

8. An indicator system for service apparatus dispensing ordered items having a cabinet with a plurality of compartments for receiving the ordered items and a remote signalling panel, comprising panel indicator means at said panel corresponding to one of said compartments, compartment indicator means at said compartment, power supply means, relay means connecting said panel indicator means to said power supply means in response to energization thereof, said relay means having energizing means for energization thereof, selector switch means connecting said power supply means to the energizing means, holding circuit means connected to said energizing means, load switch means at said compartment having unload contact means connecting the holding circuit means to said power supply means when the load switch means is in an unload position and load contact means connecting said panel indicator means and said compartment indicator means to said power supply means when the load switch means is in a load position.

9. The combination of claim 8 wherein each of said compartments includes a load supporting shelf having a fixed portion and a pivotally displaceable portion, each of said load switch means including a switch device fixedly mounted in the cabinet, an actuating arm engageable with said switch device and displaceable from said unload position to said load position, means connecting said actuating arm to the displaceable portion of the shelf for displacement therewith by an item placed on the fixed portion, and means biasing the actuating arm to the unload position.

References Cited

UNITED STATES PATENTS

| | | | |
|---|---|---|---|
| 350,450 | 10/1886 | Tucker | 340—280 |
| 3,130,395 | 4/1964 | Simjian | 340—280 |
| 3,254,335 | 5/1966 | Staten | 340—286 |

DONALD J. YUSKO, Primary Examiner

D. L. TRAFTON, Assistant Examiner

U.S. Cl. X.R.

340—286; 186—1